Feb. 24, 1959    D. J. BLACKWELL ET AL    2,874,671
ILLUMINATED METER

Filed May 3, 1957    2 Sheets-Sheet 2

INVENTORS
Dana J. Blackwell,
Edmund F. Zawacki
BY
AGENT

United States Patent Office 2,874,671
Patented Feb. 24, 1959

2,874,671

ILLUMINATED METER

Dana J. Blackwell and Edmund F. Zawacki, Naugatuck, Conn., assignors to Lewis Engineering Company, Naugatuck, Conn., a corporation of Connecticut Application May 3, 1957, Serial No. 656,875

30 Claims. (Cl. 116—129)

This invention relates to indicating instruments such as electrical meters and the like, and more particularly to illuminated indicating means for such instruments.

In the past there have been proposed and produced various arrangements and constructions by which the entire indicia or other indicating means of an instrument may be illuminated at night, so as to be readily visible. Some of these proposals have involved edge lighting of dials having graduations, numerals and the like, face lighting of such dials and the pointers movable thereover, etc. Lighting of a dial from the rear has also been employed in the past, and most of these various prior proposals and structures have in general been satisfactory for the particular requirements involved.

With the advent of super-speed and supersonic aircraft, the requirements for instrument lighting have become more exacting, and a greater performance is being required, involving all of the aspects of lighting. For example, with the higher speeds and very critical temperature and pressure conditions, greater reliability is needed, and better visibility is required both in the daytime and at night. The matters of vibration, and high acceleration and deceleration must all be considered. Moreover, it has become imperative to completely or hermetically seal instruments for aircraft use, and yet the problem of possible failure of an illuminating means must still be satisfactorily met.

The present invention overcomes the deficiencies of prior instrument lighting structures which have failed to solve the above problems and requirements, and one object of the invention is to provide a novel and improved illuminated indicator means for instruments subjected to exacting aircraft requirements as above outlined, which illuminating means has a greatly increased reliability over previous devices of this type.

Another object of this invention is to provide a novel and improved illuminating means for indicia of an indicating instrument as above characterized, which will also provide a desirable, specific type of illumination at night, which is considered to be most adaptable to the eyes when accustomed to the dark, and wherein the same indicia in the day time have a readability found to be highest for eyes accustomed to daylight.

A further object of the invention is to provide a novel and improved, illuminated-type pointer in an indicating instrument, which has the above-stated advantages, yet wherein the entire length of the pointer is brightly and uniformly lighted and readily visible at night-time.

A feature of the invention resides in the provision of a novel and improved lighted pointer having reliable illumination and adaptability to night-time sight as above set forth, wherein a greater degree of illumination may be had at the tip portion of the pointer, which cooperates with the dial scale.

Another object of the invention is to provide a novel and improved illuminated indicia means for and within a sealed instrument, which has all of the above features and advantages and is nevertheless compact and simple in its construction while still having greater reliability than prior-type illuminated indicia means.

Another feature of the invention resides in the provision of an improved electrical illuminating means as above characterized, which incorporates a novel reflecting medium serving also as part of the energizing circuit wherein the wiring of the lamp units utilized is simplified and greatly facilitated.

Still another object of the invention is to provide a novel and improved type of mark or indication which has not only the best possible visibility and readability in the daytime when it is illuminated from the front by daylight, but also has the best possible readability at night-time or in darkness, when it is being artificially illuminated from the rear.

In accomplishing this latter object we provide indicating lines or marks characterized by a relatively great width when viewed in day light, such lines or marks having central portions of lesser width which are adapted to transmit light and to be illuminated from the rear. Thus, with night or artificial lighting, the marks have visibile or illuminated portions generally narrower than the portions visible during day light.

Other features and advantages will hereinafter appear.

In the drawings accompanying this specification, similar characters of reference indicate corresponding parts wherever possible in the several views, in which.

Referring first to Figs. 1–4, the indicating instrument shown therein comprises a usual type of casing 10 having a rear transverse wall 11 provided with terminals and fittings 12, and having a front window 13 through which the indicating means of the instrument may be viewed. The casing 10 may constitute a completely sealed unit, by having the window 13 soldered in place, and by having the fittings 12 sealed to the wall 11 and the latter sealed to the body of the casing 10.

Figure 1:
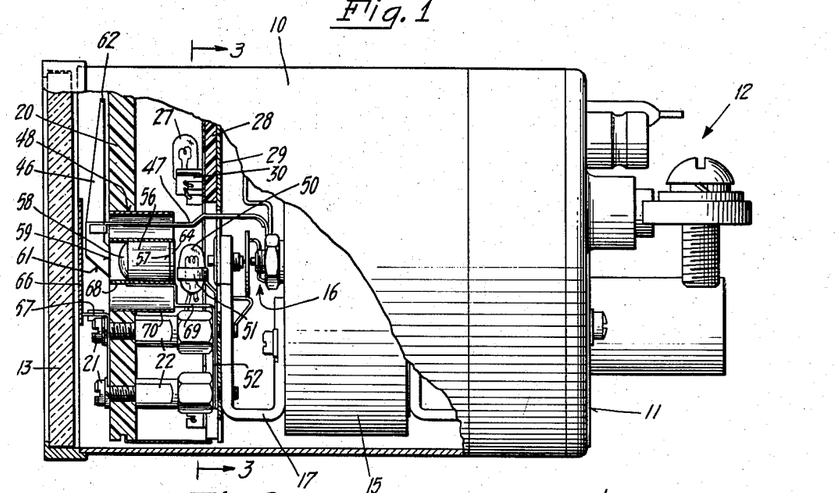
Figure 1 is an enlarged view partly in side elevation and partly in axial section of an indicating instrument having incorporated therein the improved illuminated indicia means of this invention.
Figure 2:
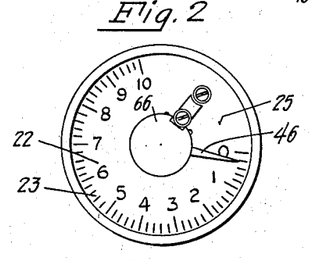
Fig. 2 is a front elevational or face view of the instrument shown in Fig. 1.

The instrument movement shown herein is of the electrical type known commonly as a D'Arsonval movement, and such instrument is mounted on and carried by the back wall 11 of the casing 10. The D'Arsonval movement may comprise a field magnet structure 15 and movable coil assembly 16, the field structure 15 being provided at its front with bracket means 17 having a pivot for the movable coil assembly, such bracket means being, in prior instruments, the same as that employed for carrying the dial plate or dial of the instrument.

In accordance with the present invention there is provided within the casing 10 and completely sealed thereby an improved illuminated indicator means by which the deflections of the movable system 16 may be easily and accurately observed both in daylight and in darkness. Such improved indicator means provides a day light visibility particularly adapted for day time vision, and provides a visibility in the dark which is particularly adapted for night vision. Also, this improved illuminated indicator means is so constituted as to be particularly reliable in use, and especially more reliable than prior, illuminated indicia of indicating instruments. Moreover, the present illuminated indicating means is compact and relatively small in size, and simple and economical to construct, while at the same time providing the most desirable type of illumination whereby the indicia are readily observable both in the day time and at night.

Accordingly, as shown, there is provided behind the window 10 and mounted on the bracket means 17 a relatively thick, sturdy dial plate 20 formed of a translucent material such as plastic. Such dial plate may be mounted by means of screws 21 and spacers 22 on the bracket means 17, and is preferably located a short distance behind the window 13. The dial plate 20 is provided on its face with translucent indicia means comprising a series of painted or otherwise printed or impressed numbers 22 and graduations 23, relating to said numbers. The numbers and graduations are light-colored, preferably of a white substance, so as to show pure white in day light, yet are transluscent whereby illumination from the rear will be evident at the front surfaces of the indicia, and will cause the same to be illuminated or to have a lighted appearance.

The remaining front surface of the dial plate 20 is provided with an opaque coating 25 or translucent coating of such nature as to provide a background lighting of predetermined value, so as to prevent so-called "floating" of the indicia, the said coating being disposed about said indicia means and sharply defining the latter. A very small amount of light from the rear of the dial plate 20 may thus, if desired, pass through the coating 25 and cause the same to exhibit a low level of illumination, thereby to provide what is known as background lighting.

To the rear of the dial plate 20 there is provided an illumination means comprising a plurality of light sources or lamps, together with reflector means whereby a uniform illumination is had, directed at the rear surface of the dial plate and fully illuminating all of the indicia at the front surface thereof. Also, coloring means are provided, to color said light, and advantageously such coloring may be accomplished by employing a colored plastic material for the dial plate 20.

Red coloring has been found to be particularly effective as regards adaptability to eyes which are accustomed to the darkness of night, and accordingly the plate 20 is advantageously formed of a red, translucent plastic. By such organization the indicia comprising the numbers 22 and graduations 23 will have a luminous and red appearance at night time, whereas in the stronger light of the day such numbers and graduations will appear perfectly white even though they are still being illuminated by red light passing through the plate 20. Accordingly there is provided an indicating means which is admirably suited to eyesight accustomed to either day light or the darkness of the night.

By this invention, the illuminating means is constituted by a novel structure supported by the bracket means 17, and comprises a plurality of incandescent lamps 27 carried on an insulating plate 28 in turn secured to a metal plate 29 fastened behind the spacer bushings 22 disposed between the dial plate 20 and bracket means 17.

Figure 3:
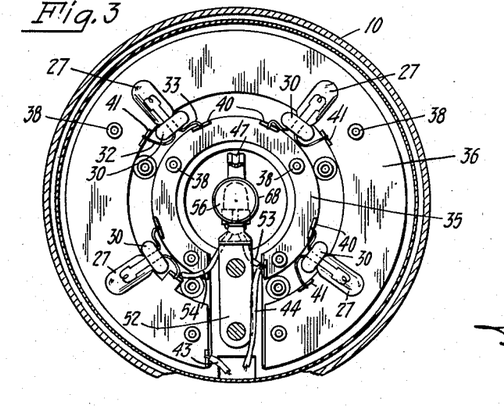
Fig. 3 is a transverse section taken on line 3—3 of Fig. 1.
Figure 4:
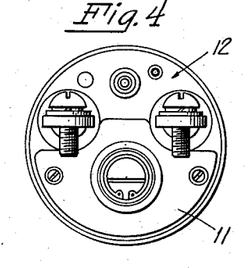
Fig. 4 is a rear elevational view of the instrument.

The lamps 27 are spaced about the axis of the instrument so as to most effectively illuminate the dial, and may occupy radial positions as shown in Fig. 3. As shown, the lamps 27 are mounted on upstanding, insulated lugs 30 which may be molded as integral parts of the insulating plate 28, and for such purpose the lugs may each have a pair of openings through which terminal wires 32 and 33 of the lamps extend.

For the purpose of providing an effective reflecting means for the lamps 27, and also to carry current thereto, two flat metal rings 35 and 36 are concentrically located and spaced from each other, being provided on the insulating plate 28 and being secured thereto by suitable rivets 38 as shown. The terminal wires 32 and 33 of the lamps 27 may be secured to lugs 40 and 41 respectively, struck up from the rings 35 and 36, and such rings may be supplied with electrical energy through wires 43 and 44, as shown in Fig. 3. The flat ring 36 is preferably highly polished, and for this purpose it may be chrome plated, or made of silver or any other suitable metal.

By this organization, illumination of the rear of the dial plate 20 will be effected from four sources, and through the medium of the reflecting ring 36 a more uniform distribution of light will be had at the surface of the dial plate. With such an organization the indicia 22 and 23 at the front of the dial plate 20 will be illuminated virtually all to the same extent, without dark or bright spots. Moreover, a desirable factor of safety is provided by the provision of the four lamps 27, since failure of one or more of such lamps will not result in the dial plate 20 being blacked out. Instead, the indicia thereof will still be visible, although the visibility will not be as good due to some variation in the uniformity of the lighting thereof. Thus, due to the number of the lamps 27 a greater reliability is had in the illuminating means, as compared with structures employing but a single light source.

The novel lighting structure of Figs. 1 and 3 is adapted to withstand considerable vibration, acceleration and mechanical stress, without failure. The lamps 27 are very minute, being termed "grain of wheat" lamps in the trade. Such lamps have a very small mass, and are structurally strong by themselves. With the provision of the mounting lugs 30, the lamps are supported by their terminal wires 32 and 33 in a manner which is somewhat yielding, although the lamps may not shift appreciably from their positions. However, such mounting minimizes vibration on the lamps, thereby insuring an increased life. At the same time, the lamps are not so loosely held that they could be made to strike adjacent surfaces and become broken. This feature of the invention contributes appreciably to the reliability, and is an important aspect when it is considered that the entire instrument including the illuminating means is hermetically sealed in the casing 10.

Of course, the lamps 27 may be fabricated with a metal or plastic base which is rigid with the envelope, and in such circumstance the lamps may be mounted by securing the bases thereof to the mounting lugs 30, or to any other suitable structures adapted to receive such bases.

Further, in accordance with this invention, there is provided a novel and improved illuminated pointer means by which the angular positions of the movable coil assembly 16 of the instrument movement may be designated with respect to the dial plate 20. This improved means comprises a pointer 46 formed of a transparent material such as plastic composition, said pointer being carried by an extension arm 47 secured to movable coil system 16. The arm 47 passes through a relatively large central opening 48 in the dial plate 20, and is secured to the pointer 46 at a location removed from the axis or center of the dial plate.

Illumination for the pointer 46 is provided by means of a lamp 50 disposed centrally with respect to the circular light-mounting plate 28, said lamp being carried by a metal clip 51 having an apertured base 52 secured under the spacer members 22. Energization of the lamp 50 is effected by attaching the terminal wires 53 and 54 thereof to the bus rings 35 and 36 respectively.

Disposed in front of the lamp 50 is a light piping and lens member 56 having a rear surface 57 disposed closely adjacent the lamp 50, and having a convex or lens-like front face 58 juxtaposed to but spaced from a flat rear surface 59 of the pointer 46. The light piping member 56 may be advantageously formed of a clear plastic of suitable composition, as will be readily understood.

Also, by the present invention there is provided on the pointer 46 a light-reflecting face 61 disposed at an angle with respect to the rear surface 59 of the pointer. The face 61 may be arranged substantially at a 45 degree angle, so that light entering through the surface 59 from the light-piping member 56 will be reflected by the face 61 along the length of the pointer 46, or upward as viewed in Fig. 1. Moreover, such light coming from the member 56 will be concentrated by the lens surface 58, thereby to enable it to provide a concentrated, bright or illuminated portion at the tip 62 of the pointer.

It will now be understood that, regardless of the rotative position of the pointer 46 the surface 59 thereof will remain juxtaposed to the convex lens surface 58 of the member 56 and will maintain its operative relation with respect thereto. Thus, for all positions of the pointer 46 it will be adequately illuminated by light from the lamp 50. The pointer 46 may be coated on its outer, front, or under surface with a translucent white coating substance, thereby to appear perfectly white in day light, yet in darkness the coating will become luminous and take on the coloring of the light brought into it. Such coloring may be imparted to the light from the bulb 50 by using a colored bulb. Or, the light piping member 56 may have a coloring, or a colored wafer 64 may be applied to the rear surface 57 of the member 56, to act as a coloring medium. It has been found that, with the above organization, it is possible to effect such a concentration of light at the tip of the pointer 46 as to cause said tip to appear more brightly illuminated than the remainder of the pointer, and this constitutes an advantageous feature of the invention.

To prevent illumination originating at the lamp 50 from being manifested at the center of the window 13, an opaque circular light shield 66 is provided, mounted by means of a bracket 67 on the screws 21. Also, the light piping member 56 may be enclosed in and carried by an opaque cylinder 68 for mounting and light-shielding purposes, and such cylinder may extend forwardly of the lens surface 58 to block side light therefrom, and may be secured in place by a bracket 69 held under the spacers 22. Additionally, a cylindrical light shield 70 may be provided, fixed in the central opening 48 of the dial plate 20, to shield light from the lamps 27.

With the above organization a simple and very effective illumination of the indicia, 22, 23 and the pointer 46 is had, such illumination during darkness being manifested as a red glow, for example, to which the eyes may readily adapt themselves, yet in day light the indicia and pointer will appear perfectly white, against the dark background or coating 25. With the structure above set forth a single source of illumination is provided for the pointer 46. To incorporate a greater reliability there may be provided an illuminating means for the pointer 46, which comprises a plurality of light sources, so that if one source should fail there would still exist light from the other source to enable readings to be had in the dark.

Figure 5:
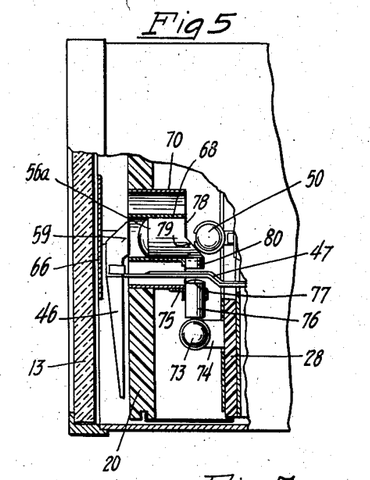
Fig. 5 is an enlarged fragmentary view partly in side elevation and partly in an axial section, showing a pointer illuminating means illustrating a modification of the invention.

An organization in accordance with this concept is shown in Fig. 5. In this figure components similar to those already described have been given similar characters. In addition to the lamp 50 there is provided a second lamp 73, carried by a lug 74 on the insulating lamp carrier ring or plate 28. The light shield 70 has a collar 75 in which there is carried a light piping member 76 having a lens surface 77, such lens surface being located outside of the path of travel of the arm 47 which carries the pointer 46.

Within the light shield 68 there is disposed a light piping and lens member 56a having at its back end a pair of faces 78 and 79, the latter being inclined 45 degrees with respect to the axis of the instrument and constituting a light-reflecting surface. The member 56a also has a lateral extension 80 aligned with the member 76 to receive light therefrom. With such organization light from the lamp 73 will be directed through the members 76 and 80, reflected by the surface 79 and pass to the left as viewed in Fig. 5, being concentrated by the lens surface and directed into the pointer 46. Also, light from the lamp 56 will, as hereinbefore explained, also pass through the member 56a and illuminate the pointer. Thus, a plurality of light sources is provided for illuminating the pointer 46, and if one such source should fail the remaining one will still be effective to enable the pointer to readily be seen in the dark.

Figure 6:
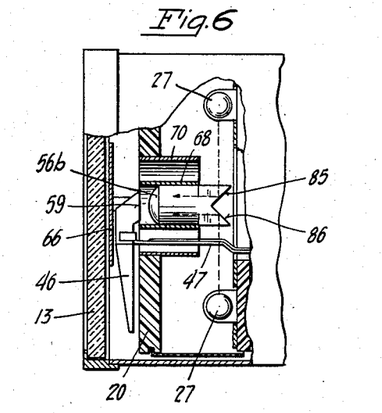
Fig. 6 is a view like Fig. 5 but showing another modification of the invention.

Another embodiment of the invention wherein a plural light source is provided, is shown in Fig. 6. In this embodiment, the lamps 27 which are utilized to illuminate the dial plate 20 are also used for illumination of the pointer 46. A light-piping and lens member 56b is provided, having a pair of light-reflecting faces 85 and 86 both of which are disposed at 45 degree angles with respect to the axis of the instrument. The surfaces 85 and 86 are at right angles to each other and are arranged to receive light from an opposite pair of the lamps 27 and to reflect such light to the left, as viewed in Fig. 6, through the member 56b and to the pointer 46. Preferably the rear portion of the member 56b is of square cross section, as shown, whereby larger reflecting surfaces 85 and 86 may be provided. Such reflecting surfaces may have slight curvatures to obtain a light collecting effect, by which more illumination is evident at the pointer 46. As with the form of the invention shown in Fig. 5, failure of one or the other of the lamps for illuminating the pointer 46 will still result in sufficient illumination being obtained from the remaining lamp, and readings could still be had.

Figure 7:
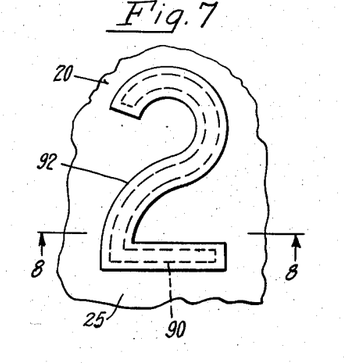
Fig. 7 is a fragmentary face or front view of a dial plate showing an improved indicator or mark structure.
Figure 8:
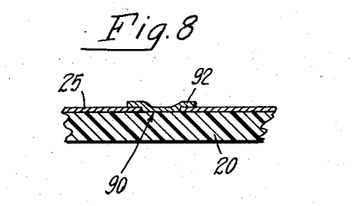
Fig. 8 is a sectional view taken on line 8—8 of Fig. 7.

There is further provided by the present invention an improved and novel indicator mark construction, by which improved visibility is had both with frontal daylight illumination and rear artificial illumination. We have found that prior to this invention a construction which would provide optimum daylight readability would not produce the best readability in the dark with artificial lighting from the rear, and vice versa. However, this problem has been solved in an extremely simple and effective way, as follows: Referring to Figs. 7 and 8, the dial plate 20 may be provided initially with the surface coating 25, said coating being withheld from portions of the dial plate which are to constitute the marks or indications. Thus, as seen in Fig. 8 there would be no coating 25 at the location indicated generally by the numeral 90, where the stem portion of the number "2" is to be disposed. Thereafter, the dial plate 20 is imprinted or otherwise coated with a suitable light-colored or white translucent coating 92 having a configuration corresponding to the area of the dial plate from which the coating 25 has been withheld. In the present instance, such configuration is shown as the number "2." However, the coating 92 is purposely made wider than the area of the dial plate 20 which is devoid of the coating 25, and such coating 92 therefore overlaps those portions of the coating 25 which border the non-coated area of the dial plate 20. The overlapping portions of the coating 92 are clearly indicated in Figs. 7 and 8, and it will now be apparent that such overlapping portions will not receive illumination from the rear of the dial plate 20, as provided by the artificial lighting above described. Therefore, the illuminated portion of the mark will be that indicated and enclosed by the broken outline shown in Fig. 7, and such portion will at all points be much narrower than the total width of the coating 92. We have found that a narrow mark artificially illuminated from the rear is more easily read than a wider mark, especially where many, closely spaced marks are provided as in the case of a scale or the like. Moreover, when the mark is illuminated from the front, as by daylight, the entire width of the mark is readily visible due to the frontal lighting, and it has been determined that for such daylight illumination a wider mark or one having more body, so to speak, is more easily readable.

While in Figs. 7 and 8 only two coatings 25 and 92 are shown, it will be readily understood that the overlapping effect by which the border portions of the mark are not illuminated from the rear may be obtained in other ways, as for example with more than two coatings, or by providing other means for making the marginal portions of the mark opaque.

When a dial is provided having marks made in accordance with the structure of Figs. 7 and 8, a greatly improved readability both in the day time and in darkness is had, due to the visible width of the mark being greater for the day-time lighting.

It will be understood that by the above structures there are provided, in accordance with the invention, novel and improved indicia and illuminated indicating means characterized by a more reliable illumination and better readability, such means being completely shielded from dirt, dust and moisture, being compact and relatively small while still efficient and effective in operation. Regardless of failure of one or several lamps, the indicator means will still be visible at night, and the structure and illumination thereof is such as to provide the maximum of visibility, with ease of accommodation, both in day light and at night.

Variations and modifications may be made within the scope of the claims, and portions of the improvements may be used without others.

We claim:

1. In an indicating instrument of the type having incandescent electric illumination, a translucent dial plate having on its front face translucent indicia means in the form of a coating, said plate having its rear face devoid of coverings and having a color different from and darker than that of the indicia means; light-obstructing means in the form of a coating disposed on the front face of the dial plate about said indicia means and sharply defining the latter; and means disposed in back of the dial plate, constituting a source of illumination whereby light therefrom may pass through the plate, illuminate the indicia means and color the latter differently in accordance with the coloring of the plate.

2. In an indicating instrument of the type having incandescent electric illumination, a translucent dial plate having on its front face translucent indicia means in the form of a coating, said plate having its rear face devoid of coverings and having a color different from and darker than that of the indicia means; light-obstructing means in the form of a coating disposed on the front face of the dial plate about said indicia means and sharply defining the latter; and means disposed in back of the dial plate, constituting a source of illumination whereby light therefrom may pass through the plate, illuminate the indicia means and color the latter differently in accordance with the coloring of the plate, said dial plate being circular and having a center opening, said indicia means extending through an arc greater than two right angles and the source of illumination comprising a plurality of lamps disposed in a circle; annular reflector means associated with said lamps, for reflecting light therefrom against the uncovered back surface of the dial plate; and a tubular shield secured to the dial plate and extending around the center opening thereof and rearward of the dial plate, to prevent light from the said source of illumination from passing through the opening.

3. In an indicating instrument of the type having incandescent electric illumination, a translucent dial plate having on its front face translucent indicia means in the form of a coating, said plate having its rear face devoid of coverings and having a color different from and darker than that of the indicia means; light-obstructing means in the form of a coating disposed on the front face of the dial plate about said indicia means and sharply defining the latter; and means disposed in back of the dial plate, constituting a source of illumination whereby light therefrom may pass through the plate, illuminate the indicia means and color the latter differently in accordance with the coloring of the plate, said dial plate being circular and having a center opening, said indicia means extending through an arc greater than two right angles and the source of illumination comprising a plurality of lamps disposed in a circle; annular reflector means associated with said lamps, for reflecting light therefrom against the uncovered back surface of the dial plate; and a tubular shield secured to the dial plate and extending around the center opening thereof and rearward of the dial plate, to prevent light from the said source of illumination from passing through the opening, an instrument movement and a dial-plate supporting means at the front thereof, disposed to the rear of said dial plate and spaced therefrom; a carrying plate carried by the dial-plate supporting means and mounting the said lamps and reflector, said carrying plate having an opening aligned with the opening of the dial plate; and a pointer-supporting member actuated by the instrument movement and extending through said aligned openings and shield.

4. In an indicating instrument of the type having incandescent electric illumination, a translucent dial plate having on its front face translucent indicia means in the form of a coating, said plate having its rear face devoid of coverings and having a color different from and darker than that of the indicia means; light-obstructing means in the form of a coating disposed on the front face of the dial plate about said indicia means and sharply defining the latter; and means disposed in back of the dial plate, constituting a source of illumination whereby light therefrom may pass through the plate, illuminate the indicia means and color the latter differently in accordance with the coloring of the plate, said dial plate being circular and having a center opening, said indicia means extending through an arc greater than two right angles and the source of illumination comprising a plurality of lamps disposed in a circle; annular reflector means associated with said lamps, for reflecting light therefrom against the uncovered back surface of the dial plate; and a tubular shield secured to the dial plate and extending around the center opening thereof and rearward of the dial plate, to prevent light from the said source of illumination from passing through the opening, said reflector means comprising a flat annulus; a second flat annulus of metal disposed inside of and insulated from said first-mentioned annulus, said lamps having their terminals connected respectively to the said annuli, to receive current therefrom.

5. In an indicating instrument of the type having incandescent electric illumination, a translucent dial plate having on its front face translucent indicia means in the form of a coating, said plate having its rear face devoid of coverings and having a color different from and darker than that of the indicia means; light-obstructing means in the form of a coating disposed on the front face of the dial plate about said indicia means and sharply defining the latter; and means disposed in back of the dial plate, constituting a source of illumination whereby light therefrom may pass through the plate, illuminate the indicia means and color the latter differently in accordance with the coloring of the plate, said dial plate having an opening in it; a pointer movable over the dial plate; means supporting the pointer, passing through the opening in the dial plate; and an opaque shield adjacent said opening of the dial plate and disposed between the source of illumination and the pointer to prevent undesired lighting of the latter.

6. In an indicating instrument of the type having incandescent electric illumination, a translucent dial plate having on its front face translucent indicia means in the form of a coating, said plate having its rear face devoid of coverings and having a color different from and darker than that of the indicia means; light-obstructing means in the form of a coating disposed on the front face of the dial plate about said indicia means and sharply defining the latter; and means disposed in back of the dial plate, constituting a source of illumination whereby light therefrom may pass through the plate, illuminate the indicia means and color the latter differently in accordance with the coloring of the plate, an illuminable pointer movable over the dial plate; means for conducting light from the rear of the dial plate to said pointer, said source of illumination including a pair of lamps spaced apart from each other; and means for directing light from each of said lamps to said light conducting-means, thereby to effect illumination of both the said indicia and pointer from the said light source.

7. In an indicating instrument of the type having incandescent electric illumination, a translucent dial plate having on its front face translucent indicia means in the form of a coating, said plate having its rear face devoid of coverings and having a color different from and darker than that of the indicia means; light-obstructing means in the form of a coating disposed on the front face of the dial plate about said indicia means and sharply defining the latter; and means disposed in back of the dial plate, constituting a source of illumination whereby light therefrom may pass through the plate, illuminate the indicia means and color the latter differently in accordance with the coloring of the plate, said light-obstructing means passing a small amount of light, thereby to cause the dial plate to be barely visible as a whole in the darkness to effect background lighting.

8. In an indicating instrument of the type having incandescent electric illumination, a translucent dial plate having on its front face translucent indicia means in the form of a coating, said plate having its rear face devoid of coverings and having a color different from and darker than that of the indicia means; light-obstructing means in the form of a coating disposed on the front face of the dial plate about said indicia means and sharply defining the latter; and means disposed in back of the dial plate, constituting a source of illumination whereby light therefrom may pass through the plate, illuminate the indicia means and color the latter differently in accordance with the coloring of the plate, said light-obstructing means passing a small amount of light, thereby to cause the dial plate to be barely visible as a whole in the darkness to effect background lighting, the light which passes through the dial plate being similar in color to the light passing through the indicia means and said dial plate appearing appreciably darker than the said indicia means.

9. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for redirecting said directed light against the said illuminable surface of the pointer.

10. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for redirecting said directed light against the said illuminable surface of the pointer, said light-providing assemblage including a pair of spaced lamps and said light-piping member having a smooth surface receiving light from one of said lamps and passing said light toward the pointer.

11. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer, said light-providing assemblage including a pair of spaced lamps and said light-piping member having a smooth surface receiving light from one of said lamps and passing said light toward the pointer; a second smooth surface on said light-piping member, receiving and reflecting light from the other of said lamps.

12. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer, said light-providing assemblage including a pair of spaced lamps and said light-piping member having a smooth surface receiving light from one of said lamps and passing said light toward the pointer; a second smooth surface on said light-piping member, receiving and reflecting light from the other of said lamps, said lamps being disposed on opposite sides of the light-piping member and said smooth surfaces of the light-piping member being planar and disposed angularly with respect to each other.

13. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer, said light-providing assemblage including a pair of spaced lamps and said light-piping member having a smooth surface receiving light from one of said lamps and passing said light toward the pointer; a second smooth surface on said light-piping member, receiving and reflecting light from the other of said lamps, said lamps being disposed on opposite sides of the light-piping member and said smooth surfaces of the light-piping member being planar and disposed angularly with respect to each other; said light-piping member further having a lens surface and being cylindrical at the end thereof adjacent the pointer and having a square cross-section adjacent its other end, the said smooth surfaces being disposed at the said other end.

14. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer, said light-providing assemblage including a pair of spaced lamps and said light-piping member having a smooth surface receiving light from one of said lamps and passing said light toward the pointer; a second smooth surface on said light-piping member, receiving and reflecting light from the other of said lamps, said lamps being disposed on opposite sides of the light-piping member and said smooth surfaces of the light-piping member being planar and disposed angularly with respect to each other; said light-piping member further having a lens surface and being cylindrical at the end thereof adjacent the pointer and having a square cross-section and a V-notch adjacent its other end, the said smooth surfaces being disposed in said V-notch.

15. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer; said light-providing assemblage including a pair of spaced lamps and said light-piping member having a smooth surface receiving light from one of said lamps and passing said light toward the pointer, the said one lamp being disposed closely adjacent the said light-piping member.

16. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer; a light-impervious shield surrounding said light-piping member, said light-providing assemblage having a lamp disposed behind the dial plate and exteriorly of said shield, directing light against the said dial plate.

17. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer, said light-providing assemblage including a lamp disposed behind the dial plate in a location to light said plate from the rear thereof, said lamp also directing light against the said light-piping member to effect illumination of the said pointer.

18. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer, said light-piping member extending close to said pointer and having a lens surface adjacent the pointer.

19. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer, said light-piping member being elongate, extending close to said pointer and having a lens surface adjacent the pointer, the axis of said member and the axis of rotation of said pointer substantially coinciding.

20. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer; said light-piping member extending close to the pointer and having a lens surface adjacent the pointer, said pointer comprising a solid body of light-conducting material, and said means on the pointer for re-directing light comprising a light-reflecting surface formed on said body.

21. In an instrument, indicator means adapted for both frontal daylight illumination and rear artificial illumination and comprising a plate adapted to pass light through it and having light-obstructing means along its surface plate defining and outlining an area having a predetermined configuration; translucent means at said plate, extending across the said area and adapted to be illuminated by light coming from the rear of the plate; and an outlining means at the plate, bordering the said area and overlying those portions of the plate bordering the area, providing an appearance similar to that of the translucent means when the latter is lighted from the front by daylight, said translucent and outlining means together having a shape similar to the said configuration as visible in daylight, and said translucent means by itself having the shape of the said configuration as visible in the dark by virtue of the said light coming from the rear of the plate.

22. Indicator means for use in an instrument, said means having an indicia mark and being adapted for both frontal daylight illumination and rear artificial illumination and comprising a light-obstructing plate defining and outlining an area having the configuration of the said mark; translucent means at said plate, extending across the said area and adapted to be illuminated by light coming from the rear of the plate; and an outlining means bordering the said area and overlying those portions of the plate bordering the area, providing an appearance similar to that of the translucent means when the latter is lighted from the front by daylight, said translucent and outlining means together constituting the said mark as visible in daylight, and said translucent means by itself constituting the said mark as visible in the dark by virtue of the said light coming from the rear of the plate, said light-obstructing plate comprising a translucent member having a light-obstructing coating, said member having the property of coloring light passing therethrough.

23. Indicator means for use in an instrument, said means having an indicia mark and being adapted for both frontal daylight illumination and rear artificial illumination and comprising a light-obstructing plate defining and outlining an area having the configuration of the said mark; translucent means at said plate, extending across the said area and adapted to be illuminated by light coming from the rear of the plate; and an outlining means bordering the said area and overlying those portions of the plate bordering the area, providing an appearance similar to that of the translucent means when the latter is lighted from the front by daylight, said translucent and outlining means together constituting the said mark as visible in daylight, and said translucent means by itself constituting the said mark as visible in the dark by virtue of the said light coming from the rear of the plate, said light-obstructing plate comprising a translucent member having a light-obstructing coating, said member having the property of coloring light passing therethrough, said translucent means and outlining means being light-colored and said plate being dark-colored.

24. Indicator means for use in an instrument, said means having an indicia mark and being adapted for both frontal daylight illumination and rear artificial illumination and comprising a light-obstructing plate defining and outlining an area having the configuration of the said mark; translucent means at said plate, extending across the said area and adapted to be illuminated by light coming from the rear of the plate; and an outlining means bordering the area and overlying those portions of the plate bordering the area, providing an appearance similar to that of the translucent means when the latter is lighted from the front by daylight, said translucent and outlining means together constituting the said mark as visible in daylight, and said translucent means by itself constituting the said mark as visible in the dark by virtue of the said light coming from the rear of the plate, said light-obstructing plate passing a small amount of light, thereby to provide a background lighting effect when the plate and mark are illuminated from the rear.

25. In an instrument, indicator means adapted for both frontal daylight illumination and rear artificial illumination and comprising a translucent plate; a light-obstructing coating on said plate, portions of said plate having a predetermined configuration being devoid of the said coating; a translucent coating disposed in part on the said devoid portions of the plate and in part on portions of the light-obstructing coating bordering the said devoid plate portions, said translucent coating having a shape similar to the said configuration.

26. Indicator means for use in an instrument, said means having an indicia mark and being adapted for both frontal daylight illumination and rear artificial illumination and comprising a translucent plate; a light-obstructing coating on said plate, portions of said plate having generally the configuration of the said mark being devoid of the said coating; a translucent coating disposed in part on the said portions of the plate and in part on portions of the light-obstructing coating bordering the said plate portions, said translucent coating having the configuration of the said mark, said light-obstructing coating passing a small amount of light from the rear of the plate to effect background lighting; means coloring the light passing through the plate from the rear thereof whereby the plate and mark have a differently colored illumination when in the dark, said mark being appreciably lighter than said plate.

27. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial palte in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer, said light-providing assemblage including a pair of spaced lamps and said light-piping member having a smooth surface receiving light from one of said lamps and passing light toward the pointer; a second smooth surface on said light-piping member, receiving and reflecting light from the other of said lamps, the said one lamp being disposed closely adjacent the said light-piping member.

28. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer; a light-impervious shield surrounding said light-piping member, said light-providing assemblage having a lamp disposed behind the dial plate and exteriorly of said shield, directing light against the said dial plate; a shield secured to the dial plate and extending around the through opening thereof, said shield being spaced radially outward from said first-mentioned shield and the said arm extending between the said shields.

29. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer; a light-impervious shield surrounding said light-piping member, said light-providing assemblage having a lamp disposed behind the dial plate and exteriorly of said shield, directing light against the said dial plate; and a colored translucent disc disposed within said light-impervious shield and against one end of the light-piping member, to color the light passing through said member.

30. In an indicating instrument having electrical incandescent illumination, in combination, a translucent, circular dial plate having a through opening at the center portion thereof, said dial plate having indicia which are visible at its front and which are adapted to be illuminated by light striking the plate from the rear thereof; a turnable pointer movable over said dial plate, said pointer having an illuminable surface spaced radially from its axis of turning; pivotal mounting means for said pointer, disposed at the rear of the dial plate, said means including an arm extending forward through the opening of the dial plate and spaced radially from the axis of the said pivotal mounting means and from the center of said dial plate, and said arm being fastened to the pointer at a point spaced radially from the center of turning of the pointer; a light-providing assemblage located at the rear of the dial plate, directing light toward said plate to pass through the same and illuminate the indicia thereof; a transparent, light-piping member disposed to extend along the axis of turning of the pointer and extending rearward of the dial plate in alignment with the opening thereof, said light-piping member being adapted to receive light from the said light-providing assemblage and to direct the light forward through the opening in the dial plate and against a light-receiving portion of said pointer disposed at the axis of turning of the pointer; and means on said light-receiving portion of the pointer, for re-directing said directed light against the said illuminable surface of the pointer, said light-providing assemblage comprising a circular plate having a lamp at the center thereof, located in alignment with the light-piping member and having other lamps disposed along peripheral portions of the plate, to supply light for the dial plate.

References Cited in the file of this patent

UNITED STATES PATENTS

| | | |
|---|---|---|
| 2,278,520 | Klein | Apr. 7, 1942 |
| 2,424,570 | Jenks | July 29, 1947 |
| 2,690,550 | Coonradt | Sept. 28, 1954 |

FOREIGN PATENTS

| | | |
|---|---|---|
| 214,644 | Switzerland | Aug. 1, 1941 |